UNITED STATES PATENT OFFICE.

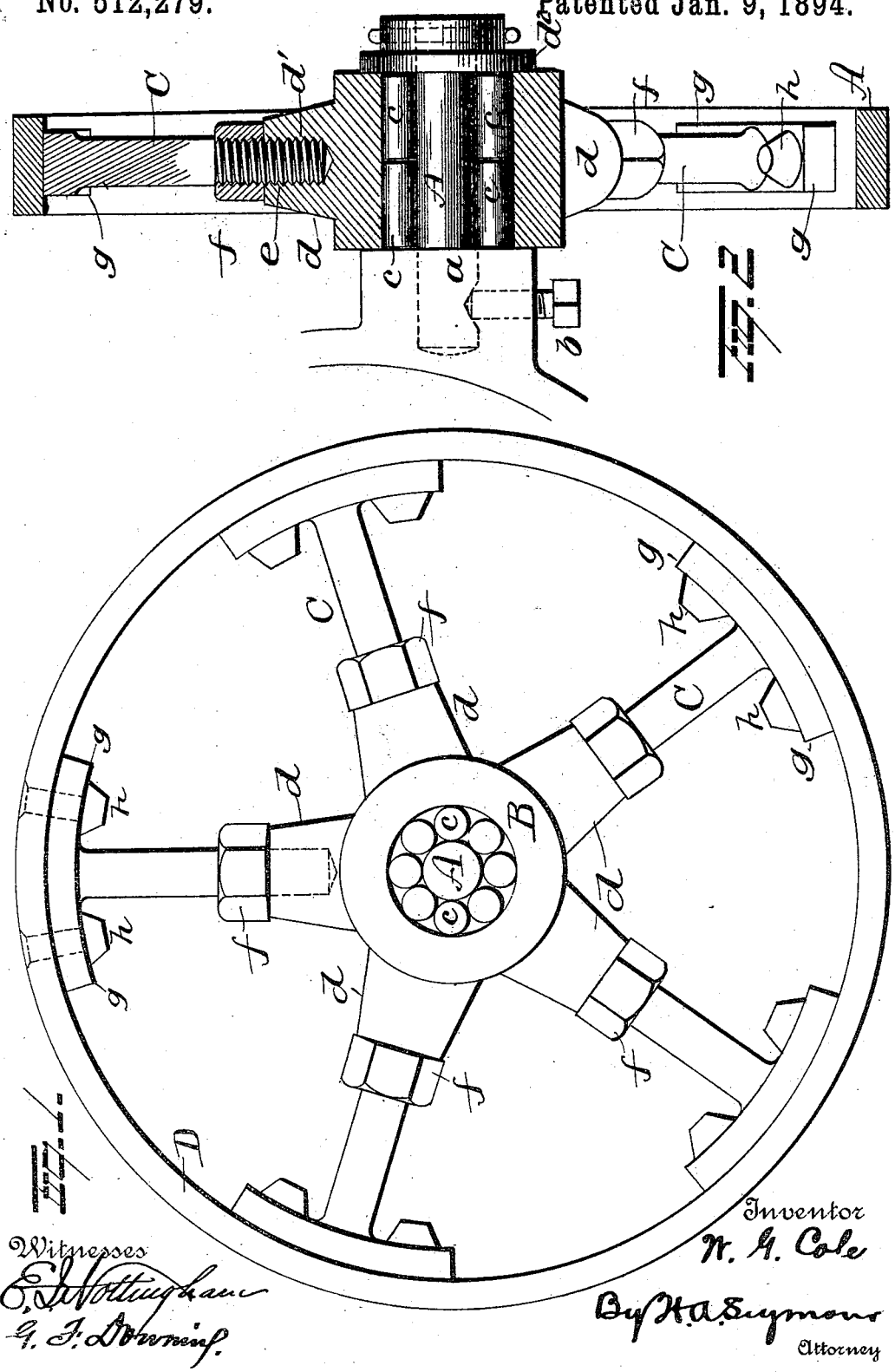

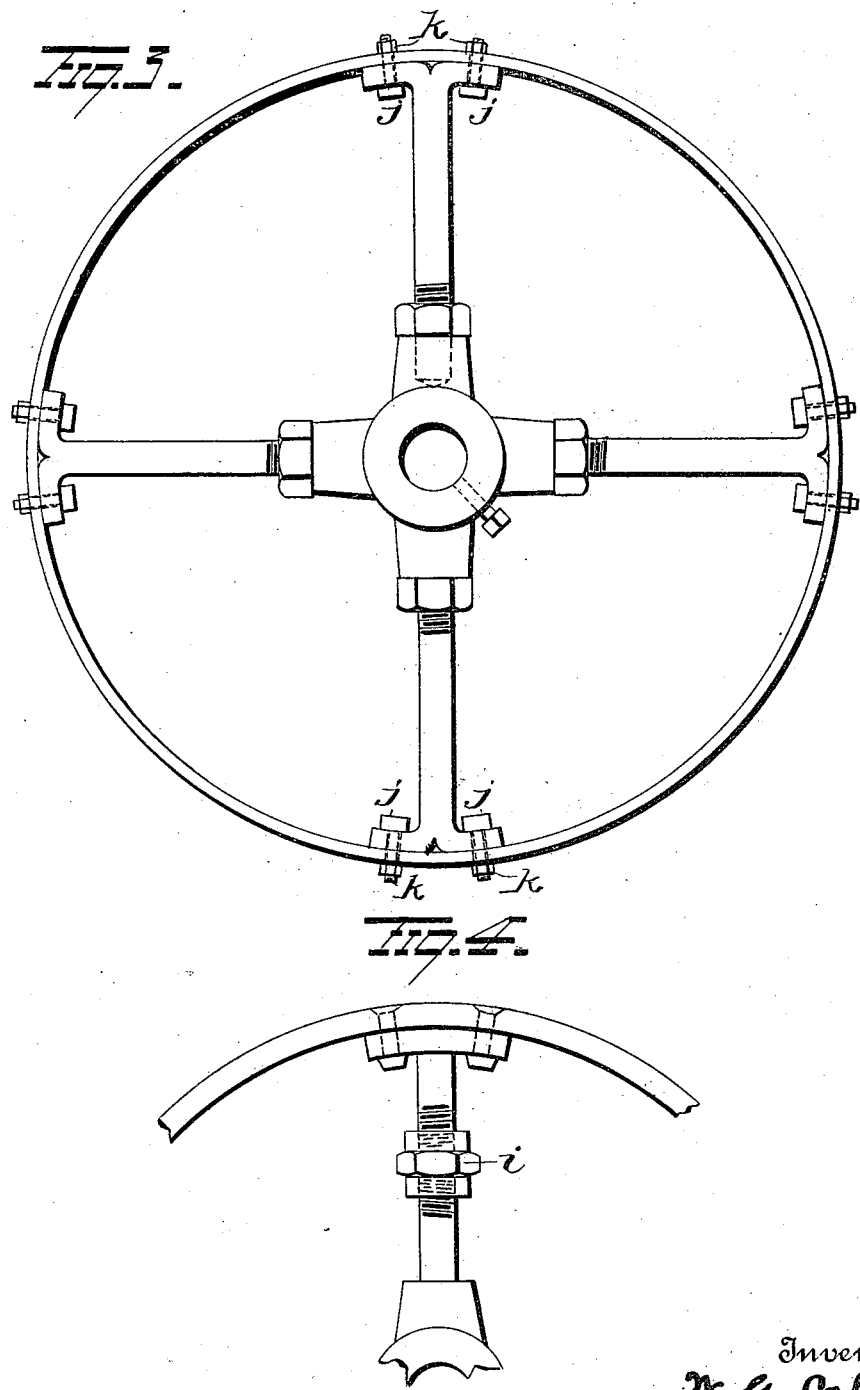

WILLIAM G. COLE, OF BUTTE, MONTANA, ASSIGNOR OF TWO-THIRDS TO HERMANN A. KELLER AND JARED E. GALORD, OF SAME PLACE.

WHEEL.

SPECIFICATION forming part of Letters Patent No. 512,279, dated January 9, 1894.

Application filed April 14, 1893. Serial No. 470,340. (No model.)

*To all whom it may concern:*

Be it known that I, WILLIAM G. COLE, of Butte city, in the county of Silver Bow and State of Montana, have invented certain new and useful Improvements in Wheels; and I do hereby declare the following to be a full, clear, and exact description of the invention, such as will enable others skilled in the art to which it appertains to make and use the same.

My invention relates to an improvement in metallic wheels,—and more particularly to that class of wheels composed of a cast iron hub and wrought iron spokes and tire.

The object of the invention is to produce a light, durable wheel especially well adapted for slag carts and ore trommels, and one which can be easily repaired.

With this object in view the invention consists in certain novel features of construction and combinations and arrangements of parts as hereinafter set forth and pointed out in the claims.

In the accompanying drawings: Figure 1 is a face view of my improved wheel. Fig. 2 is a sectional view. Fig. 3 is a view illustrating the application of the wheel for a trommel. Fig. 4 is a view of a modification.

A represents an axle or shaft adapted to be secured to a part $a$ of a slag pot by means of a set screw $b$. A hub B is mounted on the axle A and between said hub and shaft or axle rollers $c$ are located,—said rollers being prevented from escape at one end of the hub by means of the portion $a$ of the slag pot and at the other end by a washer $d^2$.

The hub B is provided with a series of elongated bosses $d$ having screwthreaded sockets $d'$, for the reception of the screwthreaded ends $e$ of the spokes C. A nut $f$ is placed on each spoke C and adapted to abut against the free end of the bosses $d$, whereby to maintain said spokes in place and tighten the wheel should, at any time, the spokes work loose. The end of each spoke is provided with laterally projecting arms $g$ adapted to receive the tire D which is preferably shrunk on the same, and retained in place by means of bolts or rivets $h$, said bolts or rivets being countersunk in the outer face of the tire.

Instead of screwing the spokes into the bosses $d$, said spokes may be each made in two parts, having right and left hand screwthreads respectively adapted to enter a right-and-left-hand threaded swivel nut $i$, as shown in Fig. 4.

In the form of wheel shown in Fig. 3, the bolts $j$ by which the spokes are secured to the tire, may be made to pass entirely through the latter and screw-threaded at their outer ends for the reception of nuts $k$.

My improved wheel is very simple in construction, cheap to manufacture, easy to adjust and repair, and effectual in the performance of its functions.

Having fully described my invention, what I claim as new, and desire to secure by Letters Patent, is—

1. The combination with an axle removably secured to the slag pot or other vehicle, and a washer on the axle, of a wheel having a hub which receives the axle and which occupies the space on the axle between the washer and the slag pot or other vehicle, said wheel comprising a hub, radial bosses, a rim or tire, and spokes, the spokes having arms thereon which are secured to the rim or tire and connected at their inner ends to the bosses, the spokes having screw threads thereon, and nuts on the screw threads adapted to turn thereon, substantially as set forth.

2. The combination with an axle removably secured to the slag pot or other vehicle, and a washer on the axle, of a wheel having a hub which receives the axle, and which occupies the space on the axle between the washer and the slag pot or other vehicle, rollers or bearings in the hub and bearing between the inner wall of the hub and axle, substantially as set forth.

In testimony whereof I have signed this specification in the presence of two subscribing witnesses.

WILLIAM G. COLE.

Witnesses:
 JARED E. GAYLORD,
 HERMANN A. KELLER.

It is hereby certified that the last named assignee in Letters Patent No. 512,279, granted January 9, 1894, upon the application of William G. Cole, of Butte, Montana, for an improvement in "Wheels," was erroneously written and printed "Jared E. Galord," whereas said name should have been written and printed *Jared E. Gaylord;* and that the said Letters Patent should be read with this correction therein that the same may conform to the corrected files and records of the case in the Patent Office.

Signed, countersigned, and sealed this 20th day of February, A. D. 1894.

[SEAL.]

JNO. M. REYNOLDS,
*Assistant Secretary of the Interior.*

Countersigned:

JOHN S. SEYMOUR,
*Commissioner of Patents.*